United States Patent [19]

Alexander

[11] Patent Number: 4,937,906
[45] Date of Patent: Jul. 3, 1990

[54] VARIABLE LIP THROW-OUT FOR DOCKBOARD

[75] Inventor: James C. Alexander, London, Canada

[73] Assignee: Serco Corporation, Ontario, Canada

[21] Appl. No.: 360,184

[22] Filed: Jun. 1, 1989

[51] Int. Cl.⁵ .............................................. E01D 1/00
[52] U.S. Cl. ...................................... 14/71.1; 14/71.3
[58] Field of Search ...................... 14/71.1, 71.3, 71.7, 14/69.5

[56] References Cited

U.S. PATENT DOCUMENTS 3,982,295 9/1976 Burnham .............................. 14/71.3
4,402,100 9/1983 Slusar .................................... 14/71.3

Primary Examiner—Jerome W. Massie, IV
Assistant Examiner—Matthew Smith
Attorney, Agent, or Firm—Sughrue, Mion, Zinn, Macpeak & Seas

[57] ABSTRACT

A dockleveler employs a lip counterbalance mechanism to increase the force of the lip counterbalance spring as the deck is raised. A linkage is coupled at one end to the dockboard lip and at the other end to a level assembly. The lever in turn is adjustably coupled to the lip spring. As the dockboard is raised, a chain coupled to the frame and the linkage exerts a force causing initial raising of the lip while pivoting the linkage downward. This in turn causes the lever to rotate such that the force on the lever pushes the linkage further raising the lip.

9 Claims, 1 Drawing Sheet

VARIABLE LIP THROW-OUT FOR DOCKBOARD

FIELD OF THE INVENTION

This invention relates to a dock leveler and in particular to an improved actuating mechanism for a dock leveler's extension lip.

BACKGROUND OF THE INVENTION

Dockboards or dock levelers are adapted for installation on loading docks to span the gap between the dock and the bed of a truck or other carrier when that truck is in position to be loaded or unloaded. These devices have found wide utilization in the materials handling industry. These devices have a ramp or deck which is hingedly mounted at its rear edge to the dock. The devices may be either pit or box mounted. Typically, the entire leveler structure is positioned within a shallow pit so that the rear hinged edge of the deck is flushed with the top surface of the dock. The deck is thus maintained in a flush position with the dock when not in use. This is the so-called cross-traffic position.

When in use, the deck is first angularly inclined upwardly relative to the dock to accommodate trucks having beds at different heights. To use the dockboard the truck to be loaded or unloaded is thus backed into position adjacent the front of the dockboard and the rear edge of the bed is adjacent but is spaced slightly from the dock. A hold-down device on the dockboard is then released so that the deck will raise upwardly, it being generally biased in an upward position by means of a spring. The upward swing of the deck causes the extension lip to be raised after it has cleared the rear end of the truck bed. With the deck now in a raised position and the lip extended, the operator walks onto the deck and by his weight lowers it into position. This causes the extension lip to move downward into engagement with the bed and thus, the lip and the front part of the deck are supported by the bed of the truck. With this technique the ramp, together with the extension lip, bridges the gap between the dock and the truck bed. The dockboard provides this bridge even though the bed on the truck may be above or below dock level. Additionally, since the truck tends to float, that is, move up or down depending on the degree of loading or unloading, the deck and the lip will automatically follow these variations in height so that repositioning is not needed.

The art is replete with the number of examples of such devices. Typical are U.S. Pat. Nos. 3,137,017, 3,995,342, 4,014,059, 4,279,050, 4,328,602, and 4,619,008. These are patents are samples and representative of an entire class of devices which have been the subject of extensive technological development.

One of the difficulties with dockboards is providing sufficient force to have the lip automatically extend as the dockboard raises. While a number of complicated spring and lever schemes have been attempted, they add to the complexity of the device and its overall cost. While additional stored energy can be provided by utilizing-additional springs to thereby provide sufficient biasing force, more powerful springs make it difficult to lower or "walk down" the dockboard when in its raised position. Consequently, there exists in the art a need to provide a simple mechanism which assists the raising the lip without unduly complicating the mechanical assembly. In prior art devices, the lip is generally extended by means of a linkage such as a chain which is attached to the lower frame. The chain is tightened as the deck reaches the top of its travel thereby causing the lip to be rotated outward. To assist in this rotation the lip is generally partially counterbalanced so that, it may be easily extended. However, it must not be so nearly counterbalanced that it will fail to fall by gravity to the stored positioned.

In the prior art, the technique of counterbalancing usually involves a spring mechanism connected between the deck and an arm fastened to a lip plate. While satisfactory for most installations, a problem occurs in that a lip, which is properly spring counterbalanced at dock level, will be inadequately balanced when the dock leveler is raised to a higher angle. This is because the moment arm from the lip hinge to the center of gravity of the lip is different in the level position than it is in a raised position. Thus, if the counterbalance allows the lip to fall when the deck is level, then the lip can only be partially counterbalanced when the deck is raised. Thus, the dock leveler spring force must be increased so that the deck is raised with greater force in order to force the lip to extend. This, in turn, requires a greater force to walk the leveler down to the stored position.

SUMMARY OF THE INVENTION

Given the difficulties in the prior art, it is an object of this invention to provide for an improved counterbalance mechanism that assists in extending of the lip of a mechanically actuated dock leveler.

It is a further object of this invention to provide for an improved dock leveler actuating mechanism which increases the force of the lip counterbalance spring as the deck is raised.

Still, a further object of this invention is to provide for an improved dock leveler which has a minimum number of mechanical components, offering improved operation.

These and other objects of this invention are accomplished by means of a chain coupled to the dock leveler frame and a pivoting link mechanism. The link mechanism is attached to a biasing spring, which, in turn, is coupled to a lever assembly mounted to the link mechanism. As the dock is raised, the extension of the lip spring is increased. When the chain is tightened, the force of the spring causes the lever assembly to push on the link and thereby assist the lip to raise in addition to the force provided by the deck spring. It also provides an increased counterbalanced-moment on the lip. By this technique the moment arm exerted by the spring on the lip in the raised position of the deck and the lip extended position can be increased to be greater than the weight moment arm alone of the lip. Consequently, lip extension with less required force by the dock leveler spring is accomplished and hence less force is needed to walk the leveler down. As the lip spring is relaxed when the dock is lowered the lip will then fall freely.

This invention will be described in greater detail by referring to the attached drawing and the description of the preferred embodiment which follows.

DESCRIPTION OF THE PREFERRED EMBODIMENT

Figure 1:
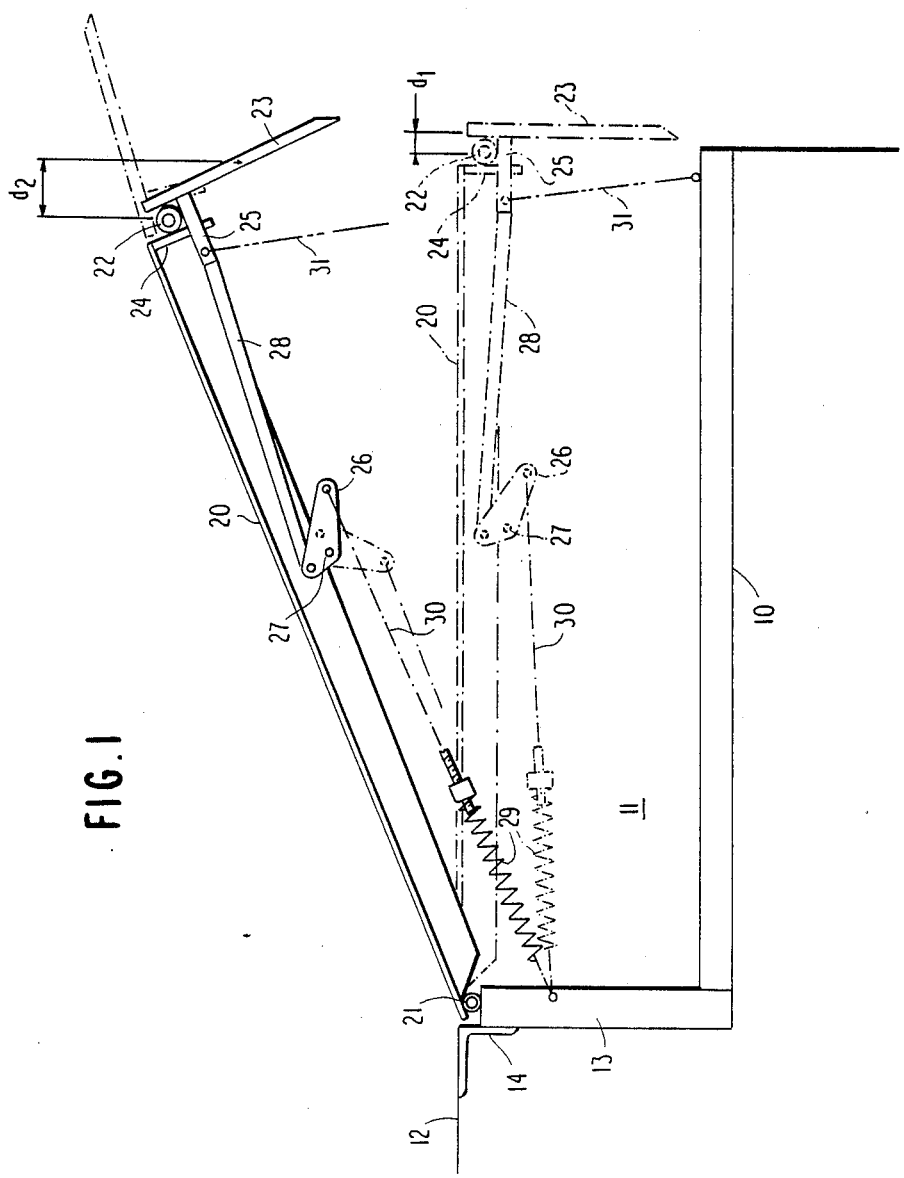
FIG. 1 is a schematic side view illustrating the leveler of this invention in the horizontal cross-traffic position and raised with the lip being extended.

Referring now to FIG. 1 a schematic side view of the dockleveler in accordance With this invention is depicted. The dockleveler generally comprises a frame member 10 which is mounted in a pit 11 at a loading dock. The dock itself has a horizontal surface 12 such that when the dockleveler deck is in the horizontal position traffic can move across the deck. This is a so-called cross-traffic position in which traffic would move in a direction perpendicular to the plane of the drawing. The dockleveler frame also comprises an upright section 13 which is attached to the pit by means of a channel L-bracket 14 or the like. By this technique, the dockleveler formed as an integral unit is mounted in the pit and secured thereto.

The dockleveler itself comprises a deck 20 which is hinged to the frame by means of a hinge pin 21. A lip plate 23 is in turn pivotally mounted to the deck by means of a hinge pin assembly 22. The hinge member is coupled to both the lip plate 23 and a lip arm 25 on one hand, and on the other hand to the forward frame portion 24 of the deck 20. The lip arm 25 is coupled to a link 28 which in turn is hinged at one end to a lever assembly 26. The lever assembly 26 has a pivot pin 27 coupled to the deck by a support member, not illustrated.

A lip spring 29 is coupled to frame member 13 and to an adjustable rod 30. The rod 30 connects one end of the spring 29 to the lever 26. A chain 31 is coupled to the lip arm 25 and to the frame member 10.

FIG. 1 illustrates the dockleveler in two positions with the lip in the pendent position and in the raised position. As illustrated in FIG. 1, when the dockleveler is in the horizontal position the distance from the center of gravity of the lip to the pivot pin of the hinge pin assembly 22 is $d_1$. However, as the deck assembly raises the center of gravity of the lip shifts given the angular orientation of the lip relative to the vertical. This results in an increased distance of the moment arm from $d_1$ to $d_2$. Given this variation in moment arm, if a counterbalance system allows the lip to fall when the deck is level (with the moment at $d_1$) then, the lip may be only partially counterbalanced when the deck is raised (with the moment arm at $d_2$). Given this difference, in conventional docklevelers the force of the deck spring (not illustrated) must be increased so that the deck is raised with greater force in order to force the lip to extend. Given the greater force required of the spring, it is more difficult to walk the leveler down to the stored position, that is, from the upright inclined position to the horizontal pendent position.

In operation, when a hold-down for the deck (not shown) is released, the deck 20 moves upward from its horizontal pendent position. The chain 31 gradually tensions, and when tightened, exerts a force on lip arm 25 tending to cause the lip 23 to rotate about hinge 22. Because the chain 31 is coupled to the lip arm 25, rotation counterclockwise of the lip 23 results in corresponding movement of the lip arm 25. This, in turn, moves the link 28 causing the lever assembly 26 to rotate about pin 27. Rotation of the lever assembly is in the clockwise direction. The pin 27 is mounted to brackets on the deck 20.

The force of the spring 29 causes the lever assembly to push the link 28, that is, assist in rotation of the lever member 26 as the spring tends to compress. Consequently, the retraction force of the spring causes the lever assembly to push on the link and thus provide an added incremental force tending to raise the lip 23 into the raised position. That position is shown by the phantom lines in FIG. 1 with the deck in the upward position.

Because the deck 20 moves relative to the frame comprising members 10 and 13, the location where the spring is attached to the frame can be selected so that as the deck is raised, the spring extension is increased. This will increase the force on the lever assembly 26 and the counterbalance moment on the lip 23. Moreover, since the lip will fall freely as the lip spring is relaxed, that is, when the deck is lowered to the stored position, the moment exerted by the spring on the lip 23 and the deck raised and lip extended position, shown in phantom line in FIG. 1, can be increased to be greater than that of the weight moment of the lip. Consequently, the lip will be extended with less force exerted by the dock leveler spring. U less force will be required to walk the dock leveler down onto the platform of the truck bed. This results in the lip extension being more smoothly accomplished.

It is apparent that modifications of this invention may be practiced without departing from the essential scope of this invention.

Having described the invention, I claim:

1. A dockleveler comprising:
   A frame mounted on a fixed structure,
   a deck hingedly connected at an inner end to said frame for movement between a generally horizontal position and a raised position,
   a lip hingedly mounted to an outer end of said deck,
   an assembly biased to raise said lip from a pendent position to an outwardly extended position, said assembly comprising a pair of link members coupled to each other, a first link member coupled to said lip, a lever coupled to a second link member, said lever mounted for rotation relative to said deck and spring means secured to said frame and coupling said lever, wherein upon upward movement of said deck, said spring means compresses to rotate said lever such that said link members extend as spring tension decreases to assist raising said lip.

2. The dockleveler of claim 1 further comprising a flexible coupling between said first link member and said frame, whereby as said deck is raised said flexible coupling tensions to pull said first link member downward causing said lip to rotate forward to said raised position.

3. The dockleveler of claim 1 wherein said spring means comprises an adjustable rod, said rod having its length varied to adjust the position of said lever so that said first and second link members are substantially in-line when said lip is in said pendent position.

4. The dockleveler of claim 2 wherein said first and second link members are coupled to each other by a pivot pin, and said flexible coupling is attached to said first link member at said pivot pin.

5. The dockleveler of claim 1 wherein said first link member is rigidly connected to said lip, a hinge having one leaf connected to said first link member and said lip and a second leaf connected to said deck, whereby said lip and said first link member pivot relative to said deck.

6. A dockleveler comprising:
   A frame mounted on a fixed structure,
   a deck having a lip pivoted to end thereof and hingedly connected at an opposite end to said frame for movement between a generally horizontal position and a raised position;

means to raise said lip from a pendent position to an outwardly extended position, said means comprising a first member coupled to said lip and to a lever, and a second member having a spring and coupled between said frame and lever, wherein upon upward movement of said deck said spring compresses to rotate said lever thereby extending said first member to rotate said lip from a pendent position to a raised position.

7. The docklever of claim 6 wherein said lip comprises an arm positioned b 90° to said lip, said arm pivotedly coupled to said first member, a flexible coupling between said arm and said frame whereby as said deck is raised said flexible coupling tensions to pull said arm downward causing said lip to rotate to said raised position.

8. The dockleveler of claim 7 wherein said means to raise said lip comprises an adjustable rod, said rod having its length varied to adjust the position of said lever so that said arm and said first member are substantially in-line when said lip is in said pendent position.

9. The dockleveler of claim 6 wherein said lever is attached to said deck.

* * * * *